US008070572B2

(12) United States Patent
Lee et al.

(10) Patent No.: US 8,070,572 B2
(45) Date of Patent: Dec. 6, 2011

(54) FISHING SIMULATION METHOD, FISHING SIMULATION EXECUTION METHOD, AND FISHING SIMULATOR

(76) Inventors: Chun Woo Lee, Busan (KR); Ju Hee Lee, Busan (KR); Gun Ho Lee, Busan (KR)

( * ) Notice: Subject to any disclaimer, the term of this patent is extended or adjusted under 35 U.S.C. 154(b) by 507 days.

(21) Appl. No.: 12/391,972

(22) Filed: Feb. 24, 2009

(65) Prior Publication Data
US 2009/0220922 A1   Sep. 3, 2009

(30) Foreign Application Priority Data

Feb. 29, 2008 (KR) .................. 10-2008-0018651

(51) Int. Cl.
*A63F 9/24* (2006.01)
(52) U.S. Cl. ............................................. 463/7
(58) Field of Classification Search ............... 463/7, 36
See application file for complete search history.

(56) References Cited

U.S. PATENT DOCUMENTS

| 3,574,262 | A | * | 4/1971 | Bowker | ........................ | 434/44 |
| 2001/0021665 | A1 | * | 9/2001 | Gouji et al. | ...................... | 463/7 |
| 2004/0166937 | A1 | * | 8/2004 | Rothschild et al. | ............ | 463/36 |

* cited by examiner

*Primary Examiner* — Brook Kebede
(74) *Attorney, Agent, or Firm* — John K. Park; Park Law Firm

(57) ABSTRACT

The present invention relates to a fishing simulation method, a fishing simulation execution method, and a fishing simulator, and more specifically, to a fishing simulation method, a fishing simulation execution method, and a fishing simulator, in which a fishing activity procedure of detecting a fish school, gathering fish, and catching the fish can be realized in a three-dimensional virtual space of a computer, and a fishery environment and fishing activity simulated in the computer virtual space comes to be similar to a real fishery environment and fishing activity by simulating the behavior of the fish school, including an avoidance behavior of fish entities forming the fish school, responding to the movement of a fishing boat and a fishing gear, thereby enhancing learning effects on the fishery environment and the fishing activity.

8 Claims, 7 Drawing Sheets

FISHING SIMULATION METHOD, FISHING SIMULATION EXECUTION METHOD, AND FISHING SIMULATOR

BACKGROUND OF THE INVENTION

1. Field of the Invention

The present invention relates to a simulation method for fish detection and capture process, a fishing simulation execution method, and a fishing simulator, and more specifically, to a fishing simulation method, a fishing simulation execution method, and a fishing simulator, in which a fishing activity procedure of detecting a fish school, gathering fish, and catching the fish can be realized in a three-dimensional virtual space of a computer, and a fishery environment and fishing activity simulated in the computer virtual space comes to be similar to a real fishery environment and fishing activity by simulating the behavior of the fish school, including an avoidance behavior of fish entities forming the fish school, responding to the movement of a fishing boat and a fishing gear, thereby enhancing learning effects on the fishery environment and the fishing activity.

2. Background of the Related Art

Recently, simulators that implement a simulation target in a computer virtual space are developed and used in a variety of fields such as vehicles, airplanes, vessels, and the like in order to determine design conditions or improve operating capability thereof.

Since such a simulator has the characteristics of changing various conditions, as well as reducing time and costs, in designing, experimenting, and operating a simulation target, there occurs frequently the case where the simulator is particularly applied to a large-scaled target or a system more than a certain scale.

Particularly, trawl fisheries, seine fisheries, long line fisheries, and the like performed at costal and adjacent sea fisheries, deep sea fisheries, and the like are large-scale fisheries targeting a fish school larger than a certain scale, in which a fishing activity is performed by complexly associating fishery environment, fishing boat movement, fishing gear movement, fish school behavior, and the like with each other. In addition, fish should be caught by accurately controlling fishing gears in accordance to the behavior of the fish school. Therefore, acquisition of expertise on fishing boats and fishing gears and capability of operating those are important for effective fishing activities.

It is general that the ability of controlling a fishing boat and fishing gears is directly learned and acquired through actual experiences of fishing activities in the sea. However, since this needs to practice towing a fishing gear using a fishing boat, a large amount of time and cost is required, and although it is skilled to handle the fishing gears, the scale of a fishing gear varies depending on the volume of a fishing boat (net towing horse power), and each fishing gear has different features depending on the type of the fishing gear. Therefore, it is difficult to learn all of the fishing gears and acquire the ability of operating them.

Since it requires a long time period and expenditure of costs to learn and to be skilled in fishing activities as described above, development of simulators for fishing activities is in progress in a variety of forms. However, most of fishing activity simulators in the prior art are analog-based techniques using mechanical equipment and simply simulate fishing boat movement. Furthermore, fishing gear movement for catching fish is at a level of simply implementing the movement in a two-dimensional space, and fish school behavior responding to the fishing gears, which configures a fishery environment, is not simulated, and thus there is a problem in that it is difficult to simulate a fishing activity similar to a real situation.

SUMMARY OF THE INVENTION

Therefore, the present invention has been made in view of the above problems, and it is an object of the present invention to provide a fishing simulation method, a fishing simulation execution method, and a fishing simulator of a new type, in which a fishing activity procedure of detecting a fish school, gathering fish, and catching the fish can be realized in a three-dimensional virtual space of a computer.

Particularly, it is an object of the present invention to provide a fishing simulation method, a fishing simulation execution method, and a fishing simulator of a new type, in which real views of fishing gears are displayed on a three-dimensional space in each fishing step by accurate calculating a variety of movements of a fishing boat and fishing gears, and a fishery environment and activity simulated in a computer virtual space comes to be similar to a real fishery environment and fishing activity by simulating behavior of the fish school, including an avoidance behavior of fish entities forming the fish school, responding to the movement of a fishing boat and a fishing gear, thereby enhancing learning effects on the fishery environment and the fishing activity.

In order to accomplish the above objects, in one aspect, the present invention provides a fishing simulation method for three-dimensionally simulating a fishery environment implemented including underwater physicochemical environment and fish school behavior and a fishing activity implemented including fishing boat movement, fishing machine operation, fishing gear movement, and fish detection through the use of a fishing simulator comprising: an input section for inputting set values that implement the fishery environment and the fishing activity; a driving section for inputting whether a fishing boat, a fishing machine, a fishing gear, and a fish finding apparatus are in operation, as well as driving values; a control section for previously setting proceeding speeds and directions of sound waves of a sonar system and a fish finder constituting the fish finding apparatus, processing fish detection data of the sonar system and the fish finder, and processing underwater physicochemical environment data, fish school behavior data, fishing boat movement data, fishing machine operation data, fishing gear movement data, and fish detection data using the set values and driving values inputted from the input section and the driving section; and an output section for displaying the fishery environment and the fishing activity based on the underwater physicochemical environment data, fish school behavior data, fishing boat movement data, fishing machine operation data, fishing gear movement data, and fish detection data received from the control section, the method comprising the steps of: receiving a sea-bottom topography mode and the speed and direction of a tide as set values through the input section, and allowing the control section to process the underwater physicochemical environment data; receiving the type and the number of entities of fish as set values through the input section, and allowing the control section to process the fish school behavior data using the sea-bottom topography mode and the speed and direction of a tide as condition values; receiving the type of the fishing boat as a set value through the input section, receiving the proceeding speed and direction of the fishing boat as driving values through the driving section, and allowing the control section to process the fishing boat movement data; selecting the type of the fishing machine, other than the fishing gear to be used for the fishing activity, as a set value through the input section and receiving the type as a set value, receiving an operation value related to the selected fishing machine through the driving section, and allowing the control section to process the fishing machine operation data; receiving the type of the fishing gear as a set value through the input section, receiving the length of a line of the fishing gear thrown into water from the fishing boat as a driving value through the driving section, and allowing the control section to process the fishing gear movement data using the sea-bottom topography mode, the speed and direction of a tide, the proceeding speed and direction of the fishing boat, and the length of the line of the fishing gear as condition values; allowing the control section to process sonar system detection data using the proceeding speed and direction of the sound wave of the sonar system and the proceeding speed and direction of the fishing boat previously set in the control section as condition values; allowing the control section to process fish finder detection data using the proceeding speed and direction of the sound wave of the fish finder and the proceeding speed and direction of the fishing boat previously set in the control section as condition values; and three-dimensionally displaying the fishery environment implemented including the underwater physicochemical environment and the fish school behavior and the fishing activity implemented including the fishing boat movement, fishing machine operation, fishing gear movement, and fish detection on a three-dimensional space by associating the underwater physicochemical environment data, fish school behavior data, fishing boat movement data, fishing machine operation data, fishing gear movement data, sonar system detection data, fish finder detection data processed in the above steps with each other.

In the fishing simulation method according to the present invention, in the step of processing the fish school behavior data, fish entities are created to have different body lengths and body weights within a predetermined range in accordance to the inputted number of fish entities, and a swimming speed vector comprising a swimming speed and a swimming direction is assigned to each of the fish entities, wherein the swimming speed vector assigned to each of the fish entities is determined by associating the swimming speed characteristics of fish corresponding to a fish type inputted from the input section with the body length of each of the fish entities.

In the fishing simulation method according to the present invention, underwater illuminance is inputted as a set value from the input section in the step of processing underwater physicochemical environment data, and in the step of processing the fish school behavior data, a situation where a fish school behavior responds to fishing gear movement is simulated by receiving the fishing gear movement data processed in the above step and allowing the control section to calculate the fish school behavior data processed in association with the fishing gear movement data, using the underwater illuminance, a swimming speed of the fish, a swimming direction of the fish, and fishing gear recognition distance of the fish corresponding to the inputted fish type as condition values.

In order to accomplish the above objects, in another aspect, the present invention provides a fishing simulation execution method for simulating a fishing activity through the use of a fishing simulator comprising: an input section for inputting set values that implement the fishery environment and the fishing activity; a driving section for inputting whether a fishing boat, a fishing machine, a fishing gear, and a fish finding apparatus are in operation, as well as driving values; a control section for previously setting proceeding speeds and directions of sound waves of a sonar system and a fish finder constituting the fish finding apparatus, processing fish detection data of the sonar system and the fish finder, and processing underwater physicochemical environment data, fish school behavior data, fishing boat movement data, fishing machine operation data, fishing gear movement data, and fish detection data using the set values and driving values inputted from the input section and the driving section; and an output section for displaying the fishery environment and the fishing activity based on the underwater physicochemical environment data, fish school behavior data, fishing boat movement data, fishing machine operation data, fishing gear movement data, and fish detection data received from the control section, the method comprising: a simulation setting step of initially setting the simulator by allowing a simulation performer to input an underwater physicochemical environment condition having a sea-bottom topography mode, the speed and direction of a tide, and underwater illuminance as set values, a fish school behavior condition having the type and the number of entities of fish as set values, a fishing boat movement condition having the type of the fishing boat as a set value, a fishing machine condition having the type of the fishing machine as a set value, and a fishing gear movement condition having the type and specification of the fishing gear as a set value through the input section; a simulation operating step of allowing the simulation performer to virtually operate the fishing boat, together with the sonar system and the fish finder installed in the fishing boat, through the driving section, and allowing the simulation performer to simulate detection of a fish school and catch of fish by examining the fishery environment in real-time through the sonar system detection data and the fish finder detection data displayed on the output section to find a fish school and inputting the proceeding speed and direction of the fishing boat, operation of the fishing machine, casting of the fishing gear, and the length of a line of the cast fishing gear in real-time through the driving section; and a fishing activity evaluation step of ending the simulation, if a predetermined time is elapsed, and evaluating a result of the fishing activity by calculating the total amount of fish caught using the fishing gear and comparing the total amount of the caught fish with the number of entities of the fish that is set in the simulation setting step.

In order to accomplish the above objects, in another aspect, the present invention provides a fishing simulator for simulating a fishery environment implemented including underwater physicochemical environment and fish school behavior and a fishing activity implemented including fishing boat movement, fishing machine operation, fishing gear movement, and fish detection, the fishing simulator comprising: an input section for inputting a sea-bottom topography, the speed and direction of a tide, underwater illuminance, the type of fish, and the number of fish entities, which configure the fishery environment, and the type of a fishing boat, the type of a fishing machine, the type and specification of a fishing gear, which configure the fishing activity, as set values; a driving section for inputting whether the fishing boat is in operation, whether the fishing machine is in operation, whether the fishing gear is thrown, whether a sonar system is in operation, whether a fish finder is in operation, the moving speed and direction of the fishing boat, and the length of a line of the fishing gear thrown into water, as driving values; a control section for processing underwater physicochemical environment data, fish school behavior data, fishing boat movement data, fishing machine operating data, and fishing gear movement data using the set values inputted from the input section and the driving values inputted from the driving section, processing sonar system detection data and fish finder detection data using predetermined proceeding speeds and directions of sound waves of the sonar system and the fish finder and the proceeding speed and direction of the fishing boat inputted from the driving section as condition values, and simulating the fishery environment and the fishing activity within a three-dimensional space of a predetermined range by associating the underwater physicochemical environment data, fish school behavior data, fishing boat movement data, fishing machine operating data, fishing gear movement data, sonar system detection data, and fish finder detection data which have been processed with each other; and an output section for displaying the fishery environment and the fishing activity simulated by the control section on a screen.

In the fishing simulator according to the present invention, the output section comprises a underwater fishing gear movement graphic monitor, a underwater fish school behavior graphic monitor, a sonar system detection monitor, a fish finder detection monitor, a dashboard monitor, and a fishing gear state information monitor.

In the fishing simulator according to the present invention, the control section comprises: a first data operation module including a fishing boat movement data operation program, a fishing machine operating data operation program, and a fishing gear movement data operation program; a second data operation module including a fish school behavior data operation program, a sonar system detection data operation program, and a fish finder detection data operation program; and a rendering operation module including a three-dimensional rendering operation program for three-dimensionally rendering the underwater physicochemical environment data, fish school behavior data, fishing boat movement data, fishing machine operating data, fishing gear movement data, sonar system detection data, and fish finder detection data inputted from the first and second data operation modules, wherein the control section has a plurality of sub-controllers, and the first and second data operation modules and the rendering operation module are embedded in such a manner as to be separated from one another in each of the sub-controllers.

According to the fishing simulation method, fishing simulation execution method, and fishing simulator of the present invention, a fishing activity procedure of detecting a fish school, gathering fish, and catching the fish can be realized in a computer virtual space. Particularly, the present invention provides a fishery environment and a fishing activity approaching a real fishery environment and fishing activity by simulating a fish school behavior including an avoidance behavior of fish entities, and thus learning effects on the fishing activity are enhanced. In addition, since a fish school that shows a different behavior depending on the type of fish and the size of fish entities can be simulated by differently setting a fish type and an entity size, a method of operating fishing gears can be acquired based on the behavior of a fish type, and thus techniques of selective fishing for increasing catch of a target fish and decreasing catch of a non-target fish can be improved in a fishing activity. In addition, movement and formation of a variety of fishing boats and fishing gears in each fishing step can be accurately calculated and viewed in a three-dimensional space, and understanding on movement of a fishing gear can be increased sine the movement of the fishing gear in the water and change of formation of the fishing gear in each fishing step can be visually confirmed. Moreover, the present invention can be utilized to upgrade fishing gears since a three-dimensional structure of the fishing gears can be clearly grasped.

Furthermore, as the fishing boat and the fishing gears can be operated while the detected fishing school and the fishing gears for catching the fish are displayed on the output section, it is possible to effectively learn how to operate the fishing boat and the fishing gears and improve the ability of operating the fishing boat and the fishing gears.

DETAILED DESCRIPTION OF THE PREFERRED EMBODIMENT

Figure 1:
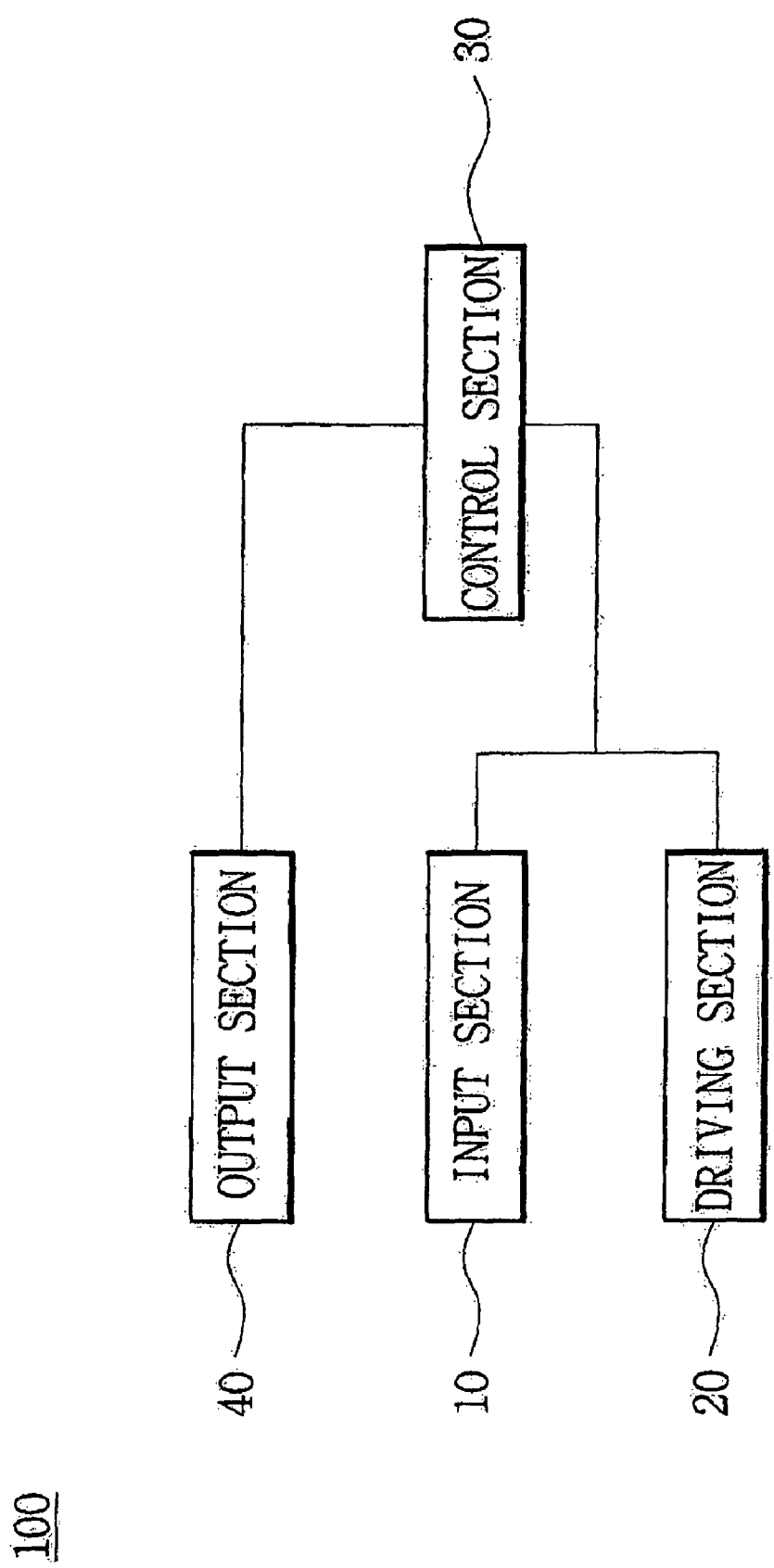
FIG. 1 is a block diagram showing a fishing simulator according to the present invention.

The preferred embodiments of the invention will be hereinafter described in detail with reference to the accompanying drawings. In the meantime, the illustration and description of the constructions and operations, which can be easily understood by those skilled in the art from a general fishing simulator in the drawings and the detailed description, will be simply made or omitted. Especially, in the illustration of the drawings and the detailed description, the detailed explanation and illustration of the concrete technical constructions and operations of elements which are directly not associated with the technical characteristics of the present invention will be omitted, and only the technical constructions of elements associated with the present invention will be simply illustrated and described.

Figure 2:
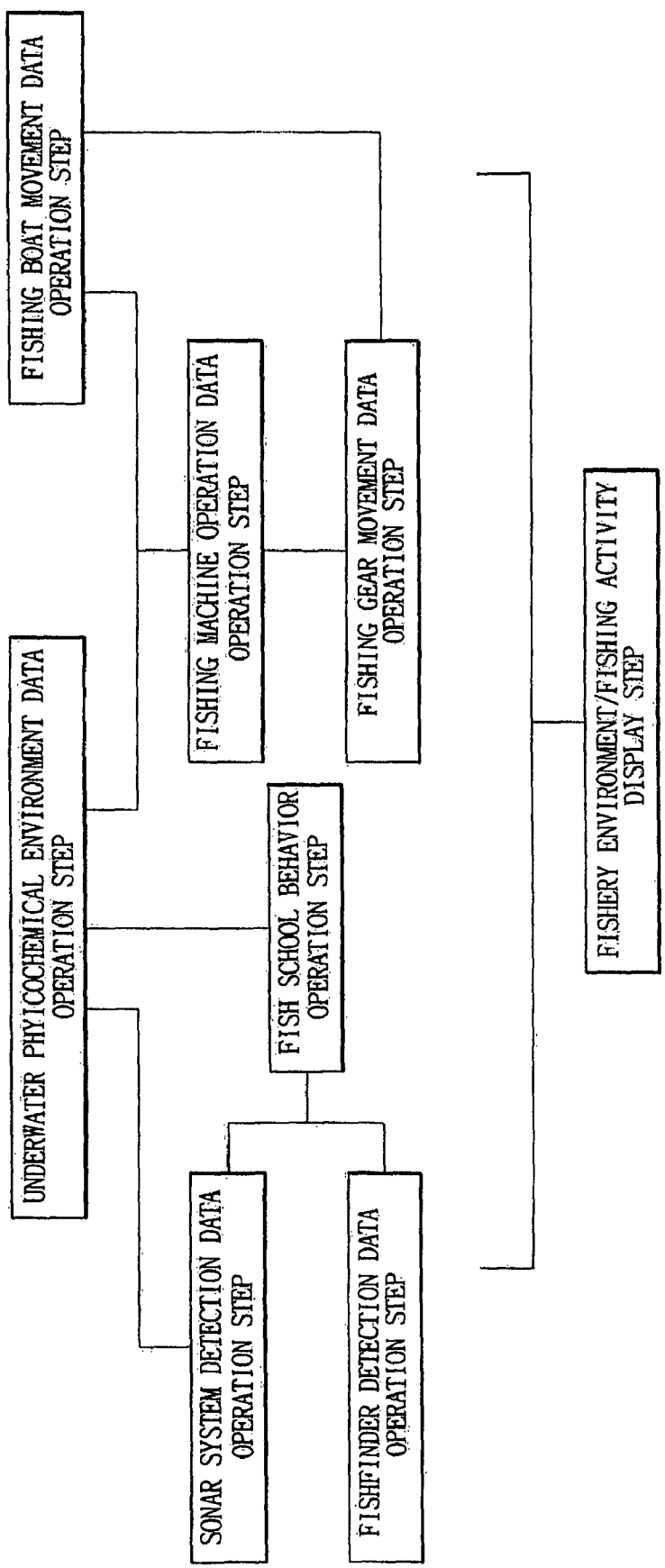
FIG. 2 is a block diagram showing a fishing simulation method according to the present invention.
Figure 3:
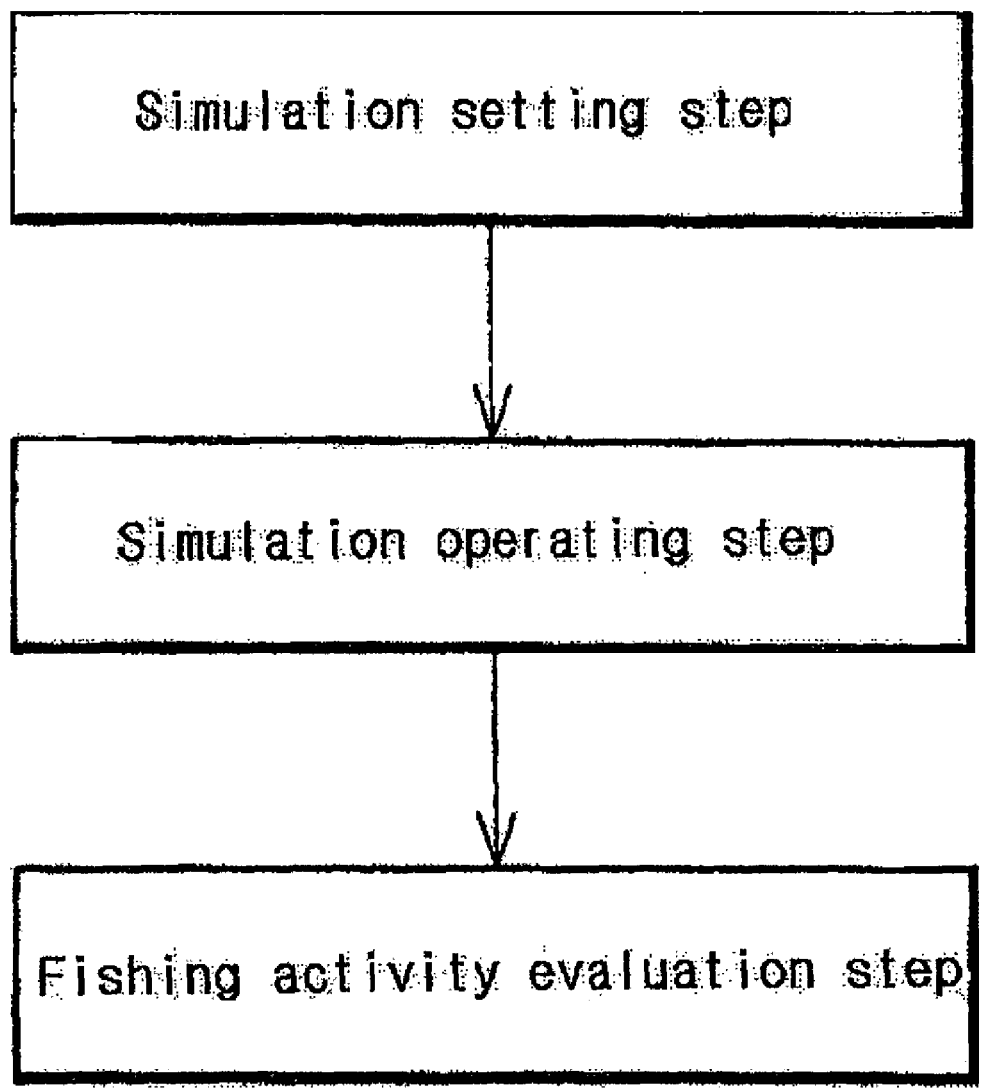
FIG. 3 is a block diagram showing a fishing simulation execution method according to the present invention.
Figure 4:
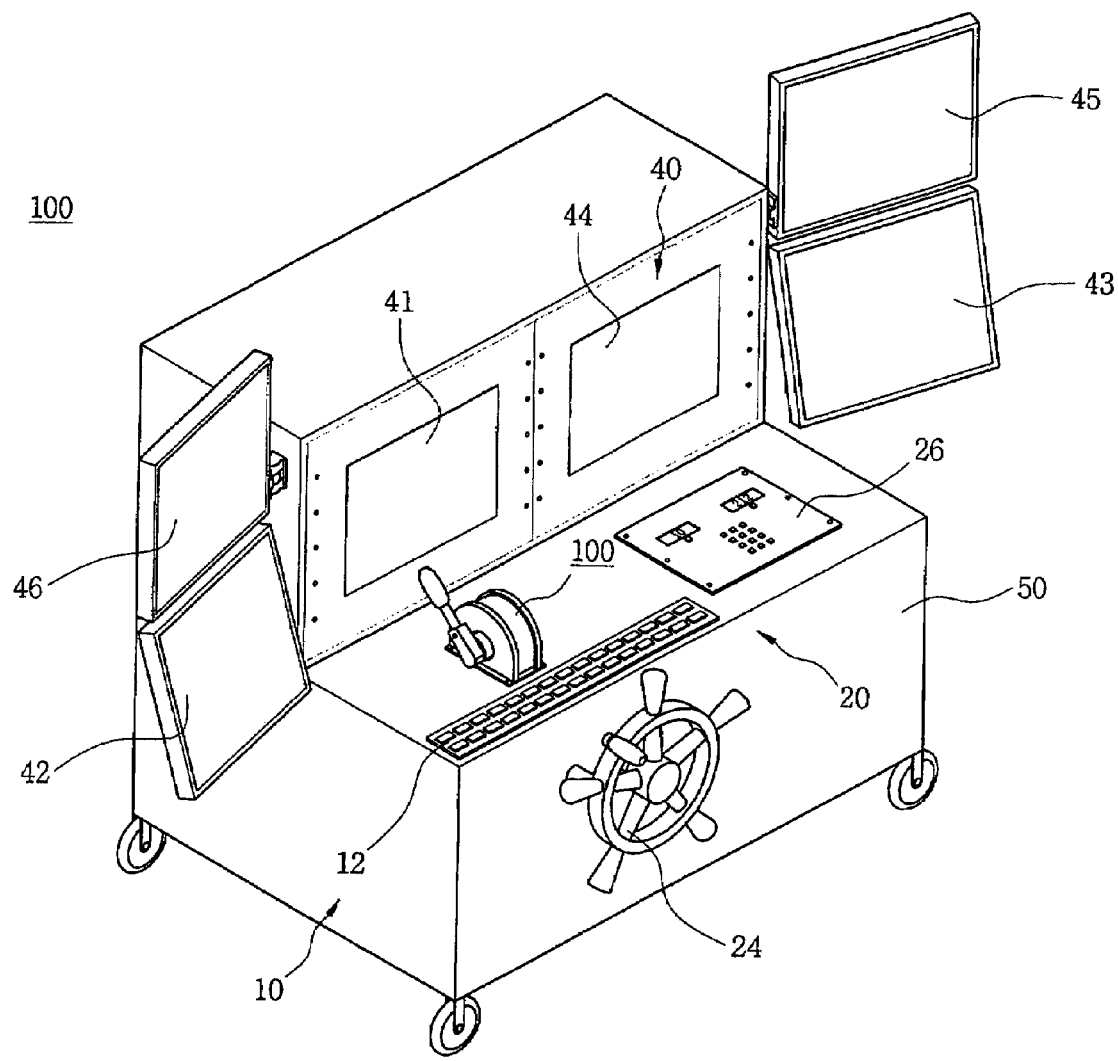
FIG. 4 is a perspective view showing a fishing simulator according to a preferred embodiment of the present invention.
Figure 5:
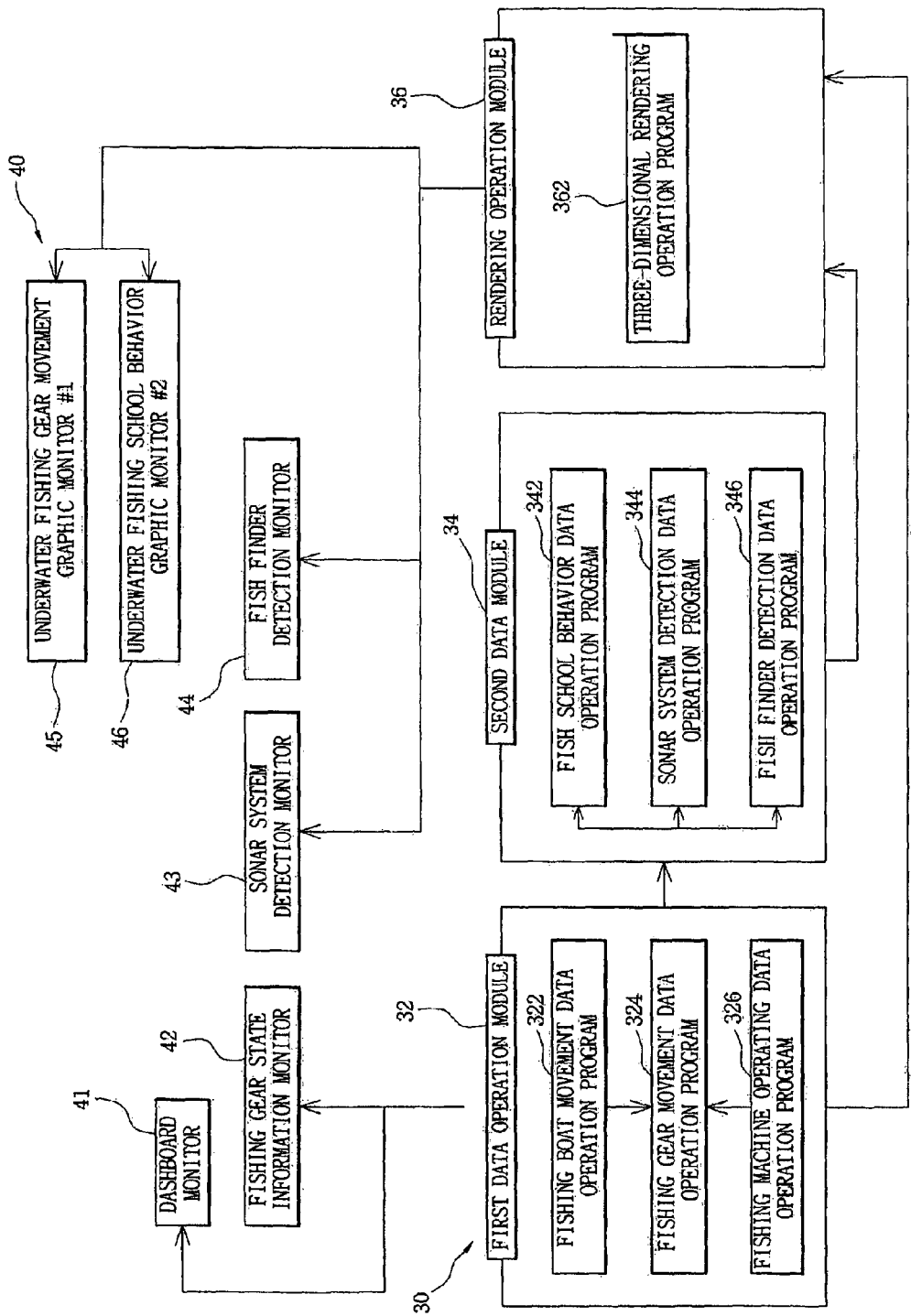
FIG. 5 is a block diagram showing the constitutional relation between a control section and an output section constituting the fishing simulator according to a preferred embodiment of the present invention.
Figure 6:
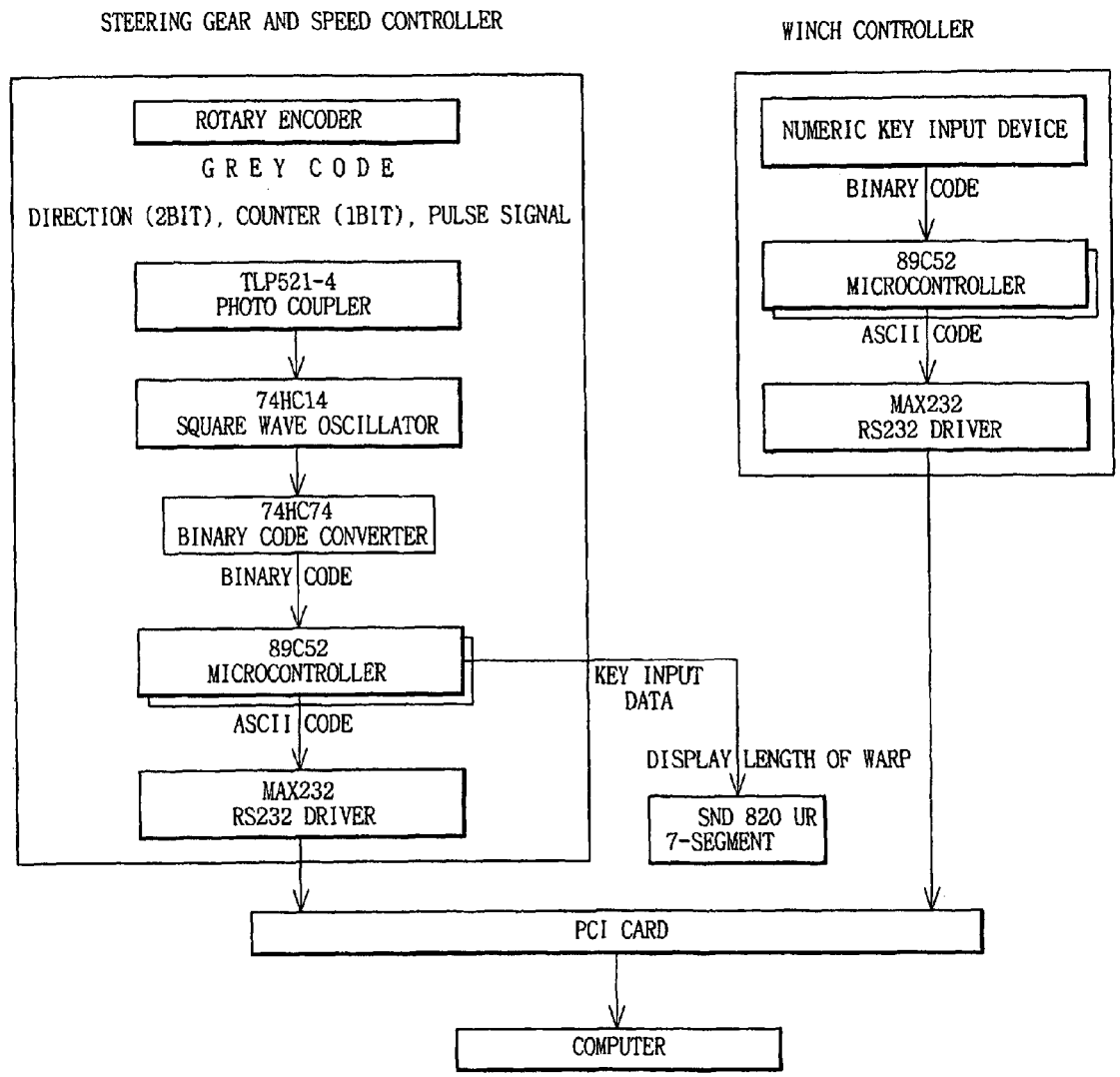
FIG. 6 is a view showing a process of converting analog signals of a steering gear, a speed controller, and a winch controller of a driving section constituting the fishing simulator to digital signals and inputting the converted signals to the control section according to a preferred embodiment of the present invention.
Figure 7:
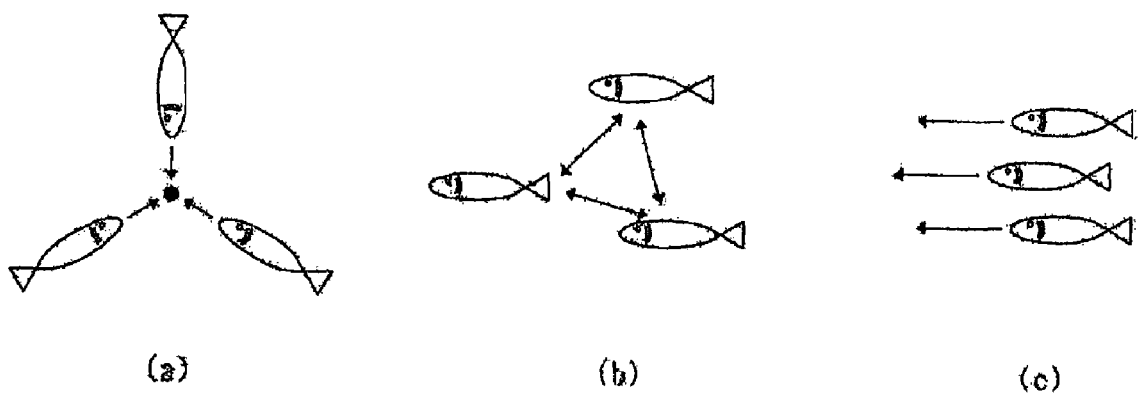
FIGS. 7(a), (b), and (c) are views showing behavioral patterns of fish for simulating a fish school behavior in the fishing simulation method according to a preferred embodiment of the present invention.

FIG. 1 is a block diagram showing a fishing simulator according to the present invention. FIG. 2 is a block diagram showing a fishing simulation method according to the present invention. FIG. 3 is a block diagram showing a fishing simulation execution method according to the present invention. FIG. 4 is a perspective view showing a fishing simulator according to a preferred embodiment of the present invention. FIG. 5 is a block diagram showing the constitutional relation between a control section and an output section constituting the fishing simulator according to a preferred embodiment of the present invention. FIG. 6 is a view showing a process of converting analog signals of a steering gear, a speed controller, and a winch controller of a driving section constituting the fishing simulator to digital signals and inputting the converted signals to the control section according to a preferred embodiment of the present invention. FIGS. 7(a), (b), and (c) are views showing behavioral patterns of fish for simulating a fish school behavior in the fishing simulation method according to a preferred embodiment of the present invention.

The fishing simulation method, fishing simulation execution method, and fishing simulator according to the present invention simulate a fishery environment implemented including underwater physicochemical environment and fish school behavior and a fishing activity implemented including movement of a fishing boat, operation of a fishing machine other than fishing gears used in a fishing activity, movement of the fishing gears, and fish detection through a sonar system and a fish finder, which realizes a fishing activity for detecting a fish school from the sea and catching the detected fish by operating the fishing boat, fishing machines, and fishing gears in a computer virtual space so that a user may learn and be skilled the knowledge and techniques accompanied in the procedure. Particularly, the present invention provides simulation of a fishery environment and fishing activity similar to a real fishery environment and fishing activity, in which the fishery environment and fishing activity are displayed in a three-dimensional space of a computer, and fish school behavior including an avoidance behavior of fish entities responding to the movement of the fishing boat and fishing gears is simulated.

The fishing simulator 100 according to the present invention comprises an input section 10, a driving section 20, a control section 30, and an output section 40 as shown in FIG. 1. The input section 10 is for setting the elements constituting a fishery environment and a fishing activity so that the fishing simulator 100 may operate in predetermined fishery environment conditions and fishing activity conditions. The input section 10 according to a preferred embodiment of the present invention inputs sea-bottom topography, the speed and direction of a tide, underwater illuminance, the type of fish, and the number of fish entities, which configure the fishery environment, and the type of a fishing boat, the type of a fishing machine (a terminology referring to a winch, line hauler, net hauler, attracting fish lamp, or the like), the type and specification of a fishing gear, which configure the fishing activity, as set values.

Here, the sea-bottom topography expresses the shape of a ground in the water having ups and downs, such as hills and valleys, in correspondence to a fishery environment performed through the fishing simulator 100 according to the present invention, and a three-dimensional virtual space of a computer further realistically expresses the sea-bottom topography.

The sea-bottom topography can be predetermined, or in order to implement further diverse and dynamic fishery environments, a plurality of sea-bottom topography modes can be set, and a simulation performer may select a sea-bottom topography mode.

In addition, depending on the conditions of a fishery environment and a fishing activity to be simulated, the simulator 100 is set by selecting a fishing boat, a fishing machine, and a fishing gear suitable for a fishing activity to be simulated among different types of fishing activities such as a trawl fishery, seine fishery, and long-line fishery. For example, if the trawl fishery is selected, the simulation can be performed by selecting either of a bottom or midwater trawl from a lower menu of the input section 10, and if the seine fishery is selected, the simulation can be performed by selecting either of a middle-scale seine such as an offshore mackerel seine or a large-scale seine such as a deep-water tuna seine from a lower menu of the input section 10. If the long-line fishery is selected, a midwater long-line fishery for tuna or the like can be simulated.

Here, the input section 10 according to a preferred embodiment of the present invention is formed outside of a simulator body 50 in the form of a keypad 12 as shown in FIG. 4, and a simulation performer sets the simulator 100 based on a setting menu displayed through a dashboard monitor 41 or the like of the output section 40.

The driving section 20 is handled to perform a real fishing activity after the fishing simulator 100 operates, and whether a fishing boat is in operation, whether a fishing machine is in operation, whether a fishing gear is thrown, whether a sonar system is in operation, whether a fish finder is in operation, the moving speed and direction of the fishing boat, and the length of the line of the fishing gear (a line connecting the fishing boat and the fishing gear, which is selected among a warp, a tightening line, a main-line, and the like) thrown into the water are inputted as driving values.

The driving section 20 according to a preferred embodiment of the present invention includes a speed controller 22 for adjusting a proceeding speed of a fishing boat, a steering gear 24 for adjusting a proceeding direction of the fishing boat, and a winch controller 26 for adjusting the length of a line (a warp, a tightening line, or a main-line) of a fishing gear thrown into or rolled back from the water, and the driving section 20 according to a preferred embodiment of the present invention uses the speed controller 22 and the steering gear 24 used in a real fishing boat as shown in FIG. 4 in order to provide an environment similar to a real fishing activity. In addition, the winch controller 26 is provided with a set button, and the length of the line of the winch inputted using the set button is displayed through a 7-segment.

Here, analog input signals of the speed controller 22 and the steering gear 24 according to a preferred embodiment of the present invention are converted into digital signals through the steps shown in FIG. 6 and inputted into the control section 30.

The control section 30 processes underwater physicochemical environment data, fish school behavior data, fishing boat movement data, fishing machine operating data, and fishing gear movement data using the set values inputted from the input section 10 and the driving values inputted from the driving section 20, and processes sonar system detection data and fish finder detection data using predetermined proceeding speeds and directions of sound waves of the sonar system and the fish finder and the proceeding speed and direction of the fishing boat inputted from the driving section 20 as condition values. A fishery environment and a fishing activity are simulated within a predetermined three-dimensional space by associating the processed underwater physicochemical environment data, fish school behavior data, fishing boat movement data, fishing machine operating data, fishing gear movement data, sonar system detection data, and fish finder detection data.

Here, the control section 30 simultaneously performs a data operation and a rendering operation for displaying data. Since the amount of the operation is large, it is difficult to smoothly perform the operation with only one CPU or controller. Therefore, the control section 30 according to a preferred embodiment of the present invention is provided with a plurality of CPUs or sub-controllers, and the data operation and rendering operation are distributed to each of the CPUs or sub-controllers. Accordingly, since data processing time of the simulator 100 is synchronized with real time, the fishing simulator 100 according to a preferred embodiment of the present invention may perform a simulation in real-time or more rapidly than real-time.

That is, as shown in FIG. 5, the control section 30 according to a preferred embodiment of the present invention includes a first data operation module 32 and a second data operation module 34 for performing a data operation and a rendering operation module 36 for performing an operation for displaying data on the three-dimensional virtual space of a computer. The first data operation module 32, the second data operation module 34, and the rendering operation module 36 are arranged to a plurality of CPUs or sub-controllers in a distributed manner, and operations are independently performed in each of the CPUs or sub-controllers and associated with one another.

Here, the first data operation module 32 includes a fishing boat movement data operation program 322, a fishing gear movement data operation program 324, and a fishing machine operating data operation program 326, and the second data operation module 34 includes a fish school behavior data operation program 342, a sonar system detection data operation program 344, and a fish finder detection data operation program 346. Here, since the amount of operation of the underwater physicochemical environment data is not so large, the physicochemical environment data may be selectively arranged to either of the first data operation module 32 or the second data operation module 34.

The rendering operation module 36 preferably includes a three-dimensional rendering operation program 362 for three-dimensionally rendering the underwater physicochemical environment data, fish school behavior data, fishing boat movement data, fishing machine operating data, fishing gear movement data, sonar system detection data, and fish finder detection data inputted from the first and second data operation modules 32 and 34.

The operation programs are arranged as described above considering the amount of operation performed in each of the operation programs.

The output section 40 receives the underwater physicochemical environment data, fish school behavior data, fishing boat movement data, fishing machine operating data, fishing gear movement data, sonar system detection data, and fish finder detection data from the control section 30 and displays the data on a screen. The output section 40 according to a preferred embodiment of the present invention comprises a underwater fishing gear movement graphic monitor 45, a underwater fish school behavior graphic monitor 46, a sonar system detection monitor 43, a fish finder detection monitor 44, a dashboard monitor 41, and a fishing gear state information monitor 42.

Here, the underwater fishing gear movement graphic monitor 45 is a monitor for displaying a movement state of a fishing gear in the water in three-dimensional graphics, and the underwater fish school behavior graphic monitor 46 is a monitor for displaying a behavior state of a fish school in the water in three-dimensional graphics. The sonar system detection monitor 43 is a monitor for displaying a current state of a fish school detected through a sonar system in the form of a dashboard or the like, and the fish finder detection monitor 44 is a monitor for displaying a current state of a fish school detected through a fish finder. The dashboard monitor 41 is a monitor for displaying set values of various elements for a fishing simulation or driving values such as a currently operating fishing boat, fishing gears, and lines of the fishing gears, and the fishing gear state information monitor 42 is a monitor for displaying a current state of fishing gears, such as height, width, depth, and the like, in a geometric form.

The fishing simulation method according to the present invention is for simulating the underwater physicochemical environment and fish school behavior that implement fishery environment, and fishing boat movement, fishing machine operation, fishing gear movement, sonar system detection, and fish finder detection that implement a fishing activity. The fishing simulator 100 configured as described above is provided, and a fishery environment and a fishing activity are simulated as shown in FIG. 2 through the underwater physicochemical environment data operation step, fish school behavior data operation step, fishing boat movement data operation step, fishing machine operating data operation step, fishing gear movement data operation step, sonar system detection data operation step, fish finder detection data operation step, and fishery environment and fishing activity display step.

The underwater physicochemical environment data operation step is a step of receiving a sea-bottom topography mode and the speed and direction of a tide as set values through the input section 10 of the simulator 100 and processing underwater physicochemical environment data at the control section 30.

The underwater physicochemical environment data operation step is a step of processing data in order to display the underwater physicochemical environment on a three-dimensional virtual space, in which the three-dimensional rendering operation program 362 of the rendering operation module 36 in the fishing simulator 100 according to the present invention performs the operation.

Here, in the underwater physicochemical environment data operation step according to a preferred embodiment of the present invention, underwater illuminance is additionally inputted as a set value through the input section 10 of the simulator 100, considering whether respective fish entities forming a fish school recognize existence of a fishing gear and the effect of the underwater illuminance on the distance of recognizing the fishing gear when a situation of a fish school behavior responding to the movement of the fishing gear is simulated in the fish school behavior data operation step.

The fish school behavior data operation step is a step of receiving the type and the number of entities of fish as set values through the input section 10 of the simulator 100 and processing fish school behavior data at the control section 30 using the speed and direction of a tide as condition values.

In the fish school behavior data operation step, fish entities are created to have different body lengths and body weights within a predetermined range in accordance to the number of fish entities inputted from the input section 10, and a swimming speed vector comprising a swimming speed and a swimming direction is assigned to each of the fish entities created as described above so that the fish entities may act at a different swimming speed in a different swimming direction.

Each of the fish entities swims in a variety of speed patterns, such as a cruise, keep-up, rush, and the like, depending on surrounding circumstances, and in the fishing simulation method according to a preferred embodiment of the present invention, the speed patterns, such as a cruise, keep-up, rush, and the like, are set to the swimming speed vector assigned to each of the fish entities depending on a condition.

Here, the cruise speed is a swimming speed that a fish entity can maintain for more than 200 minutes, the keep-up speed is a swimming speed that a fish entity can maintain for 15 seconds to 200 minutes, and the rush speed is a swimming speed that a fish entity can maintain only for less than 15 seconds.

The swimming speed vector assigned to each of the fish entities as described above is determined by associating the swimming speed characteristics of fish corresponding to a fish type inputted from the input section 10 with the body length of each of the fish entities.

For example, if mackerel is selected and inputted as a fish type in an embodiment of the present invention, the maximum cruise speed of the mackerel is determined based on the mathematical expression shown below.

(Mathematical Expression)

$$U_{ms} = 1.64 L^{0.32}$$

Here, $U_{ms}$ denotes the maximum cruise speed of the mackerel, L denotes the body length of the mackerel, and 1.64 is a characteristic value depending on the swimming speed feature of the mackerel.

On the other hand, the fish school behavior according to a preferred embodiment of the present invention is modeled as a cohesion behavior pattern as shown in FIG. 7(a), a separation behavior pattern as shown in FIG. 7(b), or an alignment behavior pattern as shown in FIG. 7(c).

The cohesion behavior pattern is a behavior pattern for adjusting the direction and speed of a fish so that each fish belonging to a fish school may move at an average position with neighboring fishes, the separation behavior pattern is a behavior pattern for adjusting the direction and speed of a fish so that each fish may not collide with neighboring other fishes, and the alignment behavior pattern is a behavior pattern for maintaining the direction and speed of each fish to be the same as those of neighboring fishes.

The fish school behaviors modeled and implemented as described above are an emergent behavior that does not have any information (a moving direction of the whole fish school and the like) on the fish school to which each fish entity belongs, and thus a fish school according to the present invention can be simulated in a manner similar to a real fish school behavior.

Here, in the fish school behavior data operation step according to a preferred embodiment of the present invention, a situation where a fish school behavior responds to fishing gear movement is simulated. For this purpose, first, in the step of processing underwater physicochemical environment data, underwater illuminance is inputted as a set value from the input section 10.

Next, in the fish school behavior data operation step, a fish school behavior including a real-time response of fish to the fishing gear calculated in real-time is modeled, using underwater illuminance that configures a fishery environment, swimming capability of fish such as a swimming speed and direction of a selected fish, and fishing gear response characteristics of the fish such as fishing gear recognition distance of the fish as condition values, together with an output value of the fishing gear movement as an input value. That is, in a preferred embodiment of the present invention, an avoidance behavior performed by fish entities forming a fish school when they find an obstacle such as a fishing gear is modeled and simulated.

As described above, in the present invention, since a fish school behavior, including an avoidance behavior of fish entities forming a fish school, responding to the movement of a fishing boat and fishing gears is simulated, the simulated fish school behavior further closely approaches a real fish school behavior, and thus the fishery environment and fishing activity simulated in a virtual space of a computer come to be similar to a real fishery environment and fishing activity.

The fishing boat movement data operation step is a step of receiving the type of a fishing boat as a set value through the input section 10 of the simulator 100, receiving the proceeding speed and direction of the fishing boat as driving values through the driving section 20 of the simulator 100, and processing fishing boat movement data at the control section 30.

The fishing machine operating data operation step is a step of selecting and receiving the type of a fishing machine, other than fishing gears to be used for a fishing activity, as a set value through the input section 10 of the simulator 100, receiving an operation value related to the selected fishing machine through the driving section 20 of the simulator 100, and processing fishing machine operating data at the control section 30.

Here, the fishing machine refers to all kinds of machines used for a fishery work, other than fishing gears, and a line hauler, net hauler, attracting fish lamp, and the like, in addition to the winch controller 26 for adjusting the length of a line (a warp, a tightening line, or a main-line) of a fishing gear thrown into or rolled back from the water, can be simulated in the present invention.

Since such a fishing machine has a different operation method depending on the characteristic of a fishing machine selected through the input section 10 of the simulator 100, a different operation value is set for each fishing machine, and the differently set operation value is inputted through the driving section 20.

The fishing gear movement data operation step is a step of receiving the type and specification of a fishing gear as set values through the input section 10 of the simulator 100, receiving the length of lines of the fishing gear as a driving value through the driving section 20 of the simulator 100, and processing fishing gear movement data at the control section 30 using a sea-bottom topography mode, speed and direction of a tide, proceeding speed and direction of a fishing boat, and the length of lines of the fishing gear as set values.

Here, the line of the fishing gear (a warp, tightening line, or main-line) is a line connecting the fishing boat and the fishing gear, and in a preferred embodiment of the present invention, the line of the fishing gear is modeled as a system comprising springs and mass points, and line movement data of the fishing gear is processed using fishery boar movement, speed and direction of a tide configuring underwater physicochemical environment, the length of the line of the fishing gear thrown into the water as condition values.

A fishing gear (net) is also modeled as a system comprising springs and mass points, and since fishing gear movement (movement of a net) is determined depending on the speed and direction of a tide configuring underwater physicochemical environment, proceeding speed and direction of the fishing boat, and towing speed that transfers net towing force of the fishing boat, fishing gear movement data is processed by associating the fishing boat movement data and the line movement data of the fishing gear, using the speed and direction of a tide as a condition value.

In the fishing gear movement data operation step described above, a fishing gear selected among all fishing gears that are important in fishery, such as a trawl fishing gear, seine fishing gear, long-line fishing gear, is processed.

The sonar system detection data operation step is a step of processing sonar system detection data at the control section 30, using the proceeding speed and direction of a sound wave of the sonar system and the proceeding speed and direction of the fishing boat predetermined in the control section 30 of the simulator 100 as condition values, and the fish finder detection data operation step is a step of processing fish finder detection data at the control section 30, using the proceeding speed and direction of a sound wave of the fish finder and the proceeding speed and direction of the fishing boat predetermined in the control section 30 of the simulator 100 as condition values.

In the sonar system detection data operation step and the fish finder detection data operation step, fish school detection by the sonar system and fish school detection by the fish finder are modeled using a collision detection method.

The collision detection method is a method of detecting whether there is a collision among three-dimensional objects defined in a virtual space of a computer, which examines whether an apex or surface configuring an object meets and overlaps with those of other objects and prevents the objects from passing through each other.

Here, the sonar system is for detecting a fish school in a comparatively wide area from a fishing boat to the left, right, front, and rear directions, and the fish finder is for detecting a fish school in an area near the fishing boat by radiating a sound wave from the bottom of the fishing boat toward the bottom of the sea to be proceeded drawing a trajectory of a circular cone.

The fishery environment and fishing activity display step is a step of associating underwater physicochemical environment data, fish school behavior data, fishing boat movement data, fishing machine operation data, fishing gear movement data, sonar system detection data, and fish finder detection data with one another and three-dimensionally displaying a fishery environment implemented including underwater physicochemical environment and a fish school behavior, and a fishing activity implemented including fish school detection comprising fishing boat movement, fishing machine operation, fishing gear movement, sonar system detection data, and fish finder detection data in a three-dimensional space, which is accomplished through a three-dimensional rendering operation.

Using the fishing simulator 100 configured as described above and the fishing simulation method comprising the steps described above, the method of simulating a fishing activity comprises a simulation setting step, a simulation operating step, and a fishing activity evaluation step.

The simulation setting step is a step of initially setting the simulator 100, in which a simulation performer inputs an underwater physicochemical environment condition having a sea-bottom topography mode, speed and direction of a tide, and underwater illuminance as set values, a fish school behavior condition having the type and the number of entities of fish as set values, a fishing boat movement condition having the type of the fishing boat as a set value, a fishing machine condition having the type of a fishing machine as a set value, and a fishing gear movement condition having the type and specification of a fishing gear as a set value, through the input section 10 of the simulator 100.

If such an initial setting of the simulator 100 is completed, a simulation is performed in the simulation operating step. In the simulation operation step, a simulation performer virtually operates the fishing boat, together with the sonar system and fish finder installed in the fishing boat, through the driving section 20. Then, the simulation performer simulates detection of a fish school and catch of fish by examining the fishery environment in real-time through the sonar system detection data and the fish finder detection data displayed on the output section 40 of the simulator 100 to find a fish school and inputting the proceeding speed and direction of the fishing boat, operation of the fishing machine, casting of the fishing gear, and the length of lines of the fishing gear in real-time through the driving section 20.

In the fishing activity evaluation step, if a predetermined time is elapsed, the simulation is ended, and the result of the fishing activity is evaluated by calculating the total amount of fish caught using the fishing gear and comparing the amount of the caught fish with the number of entities of the fish that is set in the simulation setting step.

Through the steps described above, the simulation performer acquires knowledge of operating the fishing boat, fishing gears, and fishing machines.

The fishing simulation method, fishing simulation execution method, and fishing simulator according to the present invention are a combination of software and hardware techniques, which may accelerate development of high techniques in the marine and fishery field. In addition, technical competitiveness of domestic fishing gear manufacturing industry can be enhanced by developing software and hardware related to constructing and operating fishing gears, and accordingly, the present invention may contribute to enhancing competitiveness in exporting domestic products and increasing export of the products. Furthermore, the present invention may secure a foundation for developing a fishing activity into game software.

Particularly, the fishing simulator according to the present invention can be used as a tool for easily understanding the fishing process of the fishery industry and learning and training the characteristics of fishing gears and behavior of fish schools.

While the fishing simulation method, fishing simulation execution method, and fishing simulator have been described with reference to the particular illustrative embodiments and figures, it is not to be restricted by the embodiments but only by the appended claims. It is to be appreciated that those skilled in the art can change or modify the embodiments without departing from the scope and spirit of the present invention.

What is claimed is:

1. A fishing simulation method for three-dimensionally simulating a fishery environment implemented including underwater physicochemical environment and fish school behavior and a fishing activity implemented including fishing boat movement, fishing machine operation, fishing gear movement, and fish detection through the use of a fishing simulator comprising: an input section for inputting set values that implement the fishery environment and the fishing activity; a driving section for inputting whether a fishing boat, a fishing machine, a fishing gear, and a fish finding apparatus are in operation, as well as driving values; a control section for previously setting proceeding speeds and directions of sound waves of a sonar system and a fish finder constituting the fish finding apparatus, processing fish detection data of the sonar system and the fish finder, and processing underwater physicochemical environment data, fish school behavior data, fishing boat movement data, fishing machine operation data, fishing gear movement data, and fish detection data using the set values and driving values inputted from the input section and the driving section; and an output section for displaying the fishery environment and the fishing activity based on the underwater physicochemical environment data, fish school behavior data, fishing boat movement data, fishing machine operation data, fishing gear movement data, and fish detection data received from the control section, the method comprising the steps of:

receiving a sea-bottom topography mode and the speed and direction of a tide as set values through the input section, and allowing the control section to process the underwater physicochemical environment data;

receiving the type and the number of entities of fish as set values through the input section, and allowing the control section to process the fish school behavior data using the sea-bottom topography mode and the speed and direction of a tide as condition values;

receiving the type of the fishing boat as a set value through the input section, receiving the proceeding speed and direction of the fishing boat as driving values through the driving section, and allowing the control section to process the fishing boat movement data;

selecting the type of the fishing machine, other than the fishing gear to be used for the fishing activity, as a set value through the input section and receiving the type as a set value, receiving an operation value related to the selected fishing machine through the driving section, and allowing the control section to process the fishing machine operation data;

receiving the type of the fishing gear as a set value through the input section, receiving the length of a line of the fishing gear thrown into water from the fishing boat as a driving value through the driving section, and allowing the control section to process the fishing gear movement data using the sea-bottom topography mode, the speed and direction of a tide, the proceeding speed and direction of the fishing boat, and the length of the line of the fishing gear as condition values;

allowing the control section to process sonar system detection data using the proceeding speed and direction of the sound wave of the sonar system and the proceeding speed and direction of the fishing boat previously set in the control section as condition values;

allowing the control section to process fish finder detection data using the proceeding speed and direction of the sound wave of the fish finder and the proceeding speed and direction of the fishing boat previously set in the control section as condition values; and three-dimensionally displaying the fishery environment implemented including the underwater physicochemical environment and the fish school behavior and the fishing activity implemented including the fishing boat movement, fishing machine operation, fishing gear movement, and fish detection on a three-dimensional space by associating the underwater physicochemical environment data, fish school behavior data, fishing boat movement data, fishing machine operation data, fishing gear movement data, sonar system detection data, fish finder detection data processed in the above steps with each other.

2. The method according to claim 1, wherein in the step of processing the fish school behavior data, fish entities are created to have different body lengths and body weights within a predetermined range in accordance to the inputted number of fish entities, and a swimming speed vector comprising a swimming speed and a swimming direction is assigned to each of the fish entities, wherein the swimming speed vector assigned to each of the fish entities is determined by associating the swimming speed characteristics of fish corresponding to a fish type inputted from the input section with the body length of each of the fish entities.

3. The method according to claim 2, wherein underwater illuminance is inputted as a set value from the input section in the step of processing underwater physicochemical environment data, and in the step of processing the fish school behavior data, a situation where a fish school behavior responds to fishing gear movement is simulated by receiving the fishing gear movement data processed in the above step and allowing the control section to calculate the fish school behavior data processed in association with the fishing gear movement data, using the underwater illuminance, a swimming speed of the fish, a swimming direction of the fish, and fishing gear recognition distance of the fish corresponding to the inputted fish type as condition values.

4. A fishing simulation execution method for simulating a fishing activity through the use of a fishing simulator comprising: an input section for inputting set values that implement the fishery environment and the fishing activity; a driving section for inputting whether a fishing boat, a fishing machine, a fishing gear, and a fish finding apparatus are in operation, as well as driving values; a control section for previously setting proceeding speeds and directions of sound waves of a sonar system and a fish finder constituting the fish finding apparatus, processing fish detection data of the sonar system and the fish finder, and processing underwater physicochemical environment data, fish school behavior data, fishing boat movement data, fishing machine operation data, fishing gear movement data, and fish detection data using the set values and driving values inputted from the input section and the driving section; and an output section for displaying the fishery environment and the fishing activity based on the underwater physicochemical environment data, fish school behavior data, fishing boat movement data, fishing machine operation data, fishing gear movement data, and fish detection data received from the control section, the method comprising:

a simulation setting step of initially setting the simulator by allowing a simulation performer to input an underwater physicochemical environment condition having a sea-bottom topography mode, the speed and direction of a tide, and underwater illuminance as set values, a fish school behavior condition having the type and the number of entities of fish as set values, a fishing boat movement condition having the type of the fishing boat as a set value, a fishing machine condition having the type of the fishing machine as a set value, and a fishing gear movement condition having the type and specification of the fishing gear as a set value through the input section;

a simulation operating step of allowing the simulation performer to virtually operate the fishing boat, together with the sonar system and the fish finder installed in the fishing boat, through the driving section, and allowing the simulation performer to simulate detection of a fish school and catch of fish by examining the fishery environment in real-time through the sonar system detection data and the fish finder detection data displayed on the output section to find a fish school and inputting the proceeding speed and direction of the fishing boat, operation of the fishing machine, casting of the fishing gear, and the length of a line of the cast fishing gear in real-time through the driving section; and a fishing activity evaluation step of ending the simulation, if a predetermined time is elapsed, and evaluating a result of the fishing activity by calculating the total amount of fish caught using the fishing gear and comparing the total amount of the caught fish with the number of entities of the fish that is set in the simulation setting step.

5. A fishing simulator for simulating a fishery environment implemented including underwater physicochemical environment and fish school behavior and a fishing activity implemented including fishing boat movement, fishing machine operation, fishing gear movement, and fish detection, the fishing simulator comprising:

an input section for inputting a sea-bottom topography, the speed and direction of a tide, underwater illuminance, the type of fish, and the number of fish entities, which configure the fishery environment, and the type of a fishing boat, the type of a fishing machine, the type and specification of a fishing gear, which configure the fishing activity, as set values;

a driving section for inputting whether the fishing boat is in operation, whether the fishing machine is in operation, whether the fishing gear is thrown, whether a sonar system is in operation, whether a fish finder is in operation, the moving speed and direction of the fishing boat, and the length of a line of the fishing gear thrown into water, as driving values;

a control section for processing underwater physicochemical environment data, fish school behavior data, fishing boat movement data, fishing machine operating data, and fishing gear movement data using the set values inputted from the input section and the driving values inputted from the driving section, processing sonar system detection data and fish finder detection data using predetermined proceeding speeds and directions of sound waves of the sonar system and the fish finder and the proceeding speed and direction of the fishing boat inputted from the driving section as condition values, and simulating the fishery environment and the fishing activity within a three-dimensional space of a predetermined range by associating the underwater physicochemical environment data, fish school behavior data, fishing boat movement data, fishing machine operating data, fishing gear movement data, sonar system detection data, and fish finder detection data which have been processed with each other; and an output section for displaying the fishery environment and the fishing activity simulated by the control section on a screen.

6. The fishing simulator according to claim 5, wherein the control section comprises:

a first data operation module including a fishing boat movement data operation program, a fishing machine operating data operation program, and a fishing gear movement data operation program;

a second data operation module including a fish school behavior data operation program, a sonar system detection data operation program, and a fish finder detection data operation program; and a rendering operation module including a three-dimensional rendering operation program for three-dimensionally rendering the underwater physicochemical environment data, fish school behavior data, fishing boat movement data, fishing machine operating data, fishing gear movement data, sonar system detection data, and fish finder detection data inputted from the first and second data operation modules, wherein the control section has a plurality of sub-controllers, and the first and second data operation modules and the rendering operation module are embedded in such a manner as to be separated from one another in each of the sub-controllers.

7. The fishing simulator according to claim 5, wherein the output section comprises a underwater fishing gear movement graphic monitor, a underwater fish school behavior graphic monitor, a sonar system detection monitor, a fish finder detection monitor, a dashboard monitor, and a fishing gear state information monitor.

8. The fishing simulator according to claim 7, wherein the control section comprises:

a first data operation module including a fishing boat movement data operation program, a fishing machine operating data operation program, and a fishing gear movement data operation program;

a second data operation module including a fish school behavior data operation program, a sonar system detection data operation program, and a fish finder detection data operation program; and a rendering operation module including a three-dimensional rendering operation program for three-dimensionally rendering the underwater physicochemical environment data, fish school behavior data, fishing boat movement data, fishing machine operating data, fishing gear movement data, sonar system detection data, and fish finder detection data inputted from the first and second data operation modules, wherein the control section has a plurality of sub-controllers, and the first and second data operation modules and the rendering operation module are embedded in such a manner as to be separated from one another in each of the sub-controllers.

\* \* \* \* \*